(12) United States Patent
Kawakami

(10) Patent No.: US 6,316,374 B1
(45) Date of Patent: Nov. 13, 2001

(54) DIELECTRIC CERAMIC COMPOSITION AND CERAMIC ELECTRONIC ELEMENT PRODUCED FROM THE SAME

(75) Inventor: Hiromichi Kawakami, Moriyama (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/258,638

(22) Filed: Feb. 26, 1999

(30) Foreign Application Priority Data

Feb. 27, 1998 (JP) .................................................. 10-063977

(51) Int. Cl.[7] .......................... C03C 3/089; C03C 3/091; C03C 3/093; C03C 3/097; C03C 14/00
(52) U.S. Cl. .................. 501/32; 501/63; 501/64; 501/65; 501/66; 501/67; 501/68; 501/69; 501/70
(58) Field of Search .................. 501/32, 55, 65, 501/66, 67, 63, 64, 68, 69, 70, 72

(56) References Cited

U.S. PATENT DOCUMENTS

| | | | |
|---|---|---|---|
| 4,777,092 | * 10/1988 | Kawakami et al. | 501/32 |
| 5,024,975 | * 6/1991 | Hartmann | 501/32 |
| 5,079,194 | * 1/1992 | Jean et al. | 501/32 |
| 5,141,899 | * 8/1992 | Jean et al. | 501/32 |
| 5,206,190 | * 4/1993 | Jean et al. | 501/32 |
| 5,212,121 | * 5/1993 | Omata et al. | 501/32 |
| 5,242,867 | * 9/1993 | Lin et al. | 501/32 |
| 5,283,210 | * 2/1994 | Kata et al. | 501/32 |
| 5,342,674 | * 8/1994 | Tanai et al. | 501/66 |
| 5,498,580 | * 3/1996 | Yamade et al. | 501/32 |
| 5,578,533 | * 11/1996 | Manabe et al. | 501/32 |
| 5,821,181 | * 10/1998 | Bethke et al. | 501/32 |
| 5,998,314 | * 12/1999 | Sugimoto et al. | 501/32 |

* cited by examiner

*Primary Examiner*—David R. Sample
(74) *Attorney, Agent, or Firm*—Ostrolemk, Faber, Gerb & Soffen, LLP

(57) ABSTRACT

A dielectric ceramic composition which can be sintered at low temperature and has a low dielectric constant, high Q value, and favorable temperature-dependent characteristic of capacitance (TCC) in the high-frequency region, can be used in a ceramic electronic element. The dielectric ceramic composition comprises glass and at least one of an Si—Mg—Al—O ceramic and $TiO_2$. Preferably, the compositional proportions of the three components based on wt. % represented by (glass, Si—Mg—Al—O ceramic, $TiO_2$) fall within a polygon formed by connecting points A(100, 0, 0), B(30, 70, 0), and C(30, 0, 70) in the ternary diagram of the three components.

1 Claim, 3 Drawing Sheets

DIELECTRIC CERAMIC COMPOSITION AND CERAMIC ELECTRONIC ELEMENT PRODUCED FROM THE SAME

BACKGROUND OF THE INVENTION

Field of the Invention

The present invention relates to a dielectric ceramic composition and a ceramic electronic element produced from the same. More particularly, the present invention relates to a dielectric ceramic composition which has a high value of Q (hereinafter referred to as "high Q") in a high-frequency region such as a microwave region or a millimeter wave region and which provides a glass ceramic material useful for a low-temperature-firable dielectric ceramic composition for temperature compensation, and to a ceramic electronic element made from the composition, such as a monolithic capacitor.

BACKGROUND ART

As mobile communication devices are operated in a higher-frequency region and at higher speed, a dielectric ceramic must have a higher Q in the high-frequency region. Conventionally, a resonator material having a composition such as Ba—Nd—Pb—Ti—O has been known as a material having a high Q in a high-frequency region, and an alumina-borosilicate glass ceramic substrate has been known as a low-temperature-sinterable material.

However, although such a resonator material has a high Q, sintering thereof at a temperature as low as 1050° C. or lower is difficult and does not allow formation of an electrode from a material such as Ag or Cu. In addition, a low-temperature-sinterable alumina glass ceramic has a disadvantageously low Q.

SUMMARY OF THE INVENTION

In view of the foregoing, an object of the present invention is to provide a novel dielectric ceramic composition which can be sintered at low temperature and has a high Q and a good temperature-dependent characteristic of capacitance in the high-frequency region. Another object of the present invention is to provide a ceramic electronic element produced from the same.

Accordingly, in a first aspect of the present invention, there is provided a dielectric ceramic composition comprising glass and at least one of an Si—Mg—Al—O ceramic and $TiO_2$.

Preferably, in the dielectric ceramic composition according to the present invention, the compositional proportions of the three components based on wt. % of (glass, Si—Mg—Al—O ceramic, $TiO_2$) fall within a polygon formed by connecting points A(100, 0, 0), B(30, 70, 0), and C(30, 0, 70) in the ternary diagram of FIG. 1.

More preferably, the compositional proportions of the three components based on wt. % of (glass, Si—Mg—Al—O ceramic, $TiO_2$) fall within a polygon formed by connecting points A'(100, 0, 0), B'(30, 70, 0), C'(30, 30, 40), and D'(80, 0, 20) in the ternary diagram of FIG. 1.

Still more preferably, the compositional proportions of the three components based on wt. % of (glass, Si—Mg—Al—O ceramic, $TiO_2$) fall within a polygon formed by connecting points A"(100, 0, 0), B"(40, 60, 0), C"(30, 65, 5), D"(30, 50, 20), and E"(85, 0, 15) in the ternary diagram of FIG. 1.

Furthermore, the glass is preferably silicate glass in the dielectric ceramic composition according to the present invention.

Preferably, the silicate glass comprises $SiO_2$ and at least one of $B_2O_3$ and $K_2O$, wherein the compositional proportions of the three components based on wt. % of ($SiO_2$, $B_2O_3$, $K_2O$) fall within a polygon formed by connecting points F(65, 35, 0), G(65, 20, 15), H(85, 0, 15), and I(85, 15, 0) in the ternary diagram of FIG. 2.

More preferably, the silicate glass compositional proportions of the three components based on wt. % of ($SiO_2$, $B_2O_3$, $K_2O$) fall within a polygon formed by connecting points J(75, 24.5, 0.5), K(75, 22, 3), L(85, 12, 3), and M(85, 14.5, 0.5) in the ternary diagram of FIG. 2.

Preferably, the silicate glass contains, in addition to the mentioned primary components, i.e., $SiO_2$ and at least one of $B_2O_3$ and $K_2O$, at least one species selected from among $Li_2O$, $Na_2O$, $MgO$, $CaO$, $SrO$, $BaO$, $ZnO$, $Al_2O_3$, $La_2O_3$, $Ta_2O_5$, $Nd_2O_3$ and compounds thereof in an amount of 5 wt. % or less based on 100 wt. % of the entirety of the primary components of the silicate glass.

Furthermore, preferably, in the Si—Mg—Al—O ceramic component of the dielectric ceramic composition according to the present invention, the compositional proportions of the three components based on mol % of ($SiO_2$, $Al_2O_3$, MgO) falls within a polygon formed by connecting points N(100, 0, 0), O(50, 50, 0), P(0, 50, 50), and Q(0, 0, 100) in the ternary diagram of FIG. 3.

In a second aspect of the present invention, there is provided a ceramic electronic element including a dielectric layer formed from the dielectric ceramic composition according to the present invention.

In a third aspect of the present invention, there is provided a monolithic ceramic capacitor including a dielectric layer formed from the dielectric ceramic composition according to the present invention.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

DESCRIPTION OF PREFERRED EMBODIMENTS

The reasons why the range of the compositional proportions of glass/Si—Mg—Al—O ceramic/$TiO_2$ is limited as described will next be described with reference to the ternary diagram shown in FIG. 1.

Figure 1:
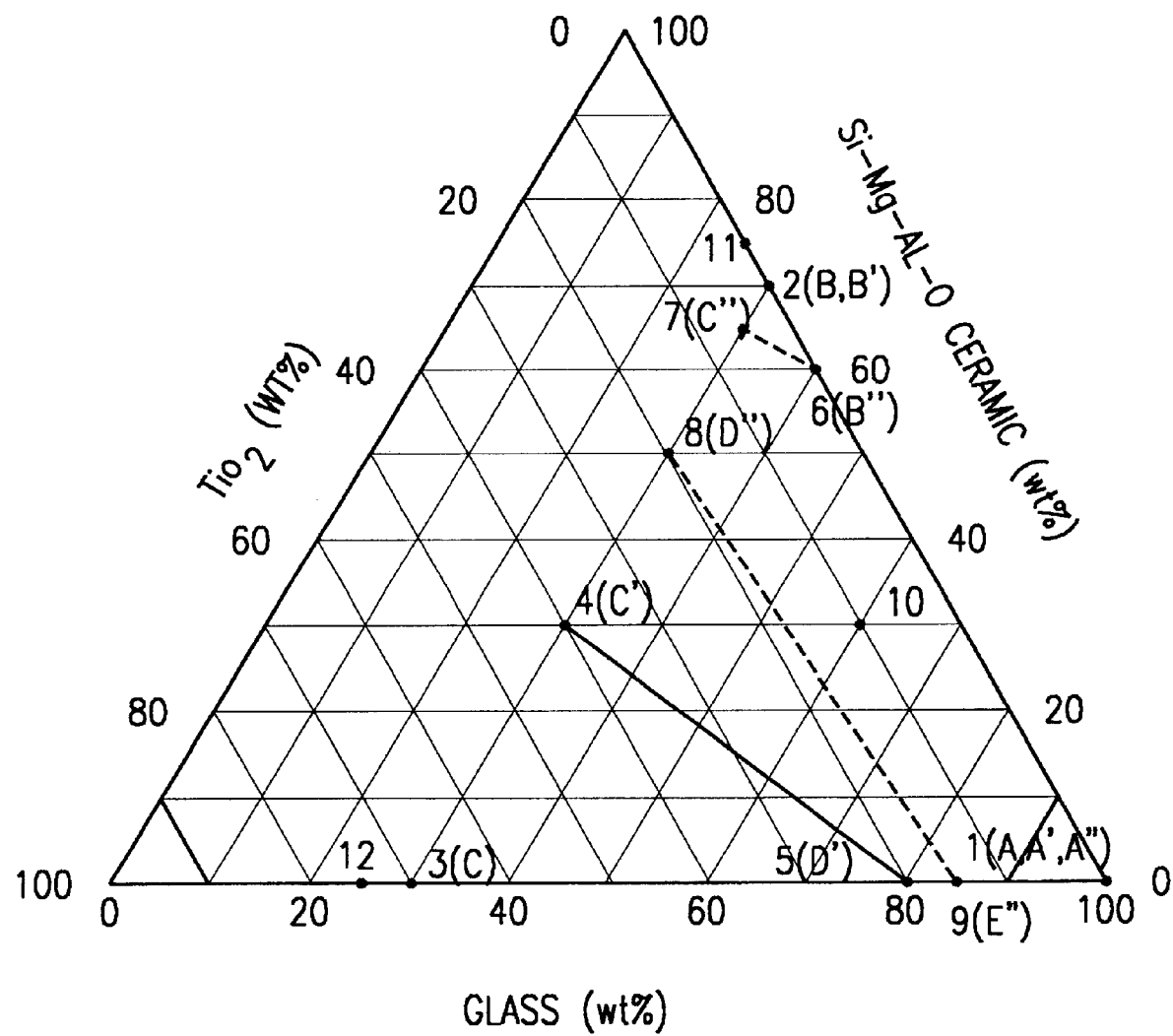
FIG. 1 is a ternary diagram showing a range of the compositional proportions of silicate glass/Si—Mg—Al—O ceramic/$TiO_2$ in the dielectric ceramic composition of the present invention.

The compositional proportions of the three components represented by (glass, Si—Mg—Al—O ceramic, $TiO_2$) preferably fall within a domain formed by connecting points A(100, 0, 0), B(30, 70, 0), and C(30, 0, 70) in the ternary diagram shown in FIG. 1. When the proportions fall outside the scope of the present invention, as in the case of Samples 11 and 12 shown in Table 2, the samples cannot be sintered at 1050° C. or less, which is disadvantageous.

More preferably, the compositional proportions of the three components represented by (glass, Si—Mg—Al—O ceramic, $TiO_2$) fall within a domain formed by connecting points A' (100, 0, 0), B' (30, 70, 0), C' (30, 30, 40), and D' (80, 0, 20) in the ternary diagram of FIG. 1. When the proportions fall within this domain, as in the case of Samples 1, 2, 4, and 5 shown in Table 2, the temperature-dependent characteristic of capacitance (TCC) thereof is favorable; i.e., it falls within ±300 ppm/° C.

Still more preferably, the compositional proportions of the three components represented by (glass, Si—Mg—Al—O ceramic, $TiO_2$) fall within a domain formed by connecting points A"(100, 0, 0), B"(40, 60, 0), C"(30, 65, 5), D"(30, 50, 20), and E"(85, 0, 15) in the ternary diagram of FIG. 1. When the proportions fall within this domain, as in the case of Samples 1 and 6 to 9 shown in Table 2, the temperature-dependent characteristic of capacitance (TCC) is more favorable; i.e., it falls within ±100 ppm/° C.

Next, the reasons why the range of the compositional proportions of the glass component is limited will be described with reference to the ternary diagram shown in FIG. 2.

The glass contained in the dielectric ceramic composition according to the present invention is preferably silicate glass. Preferably, the silicate glass comprises $SiO_2$ and at least one of $B_2O_3$ and $K_2O$, wherein the compositional proportions of the three components represented by ($SiO_2$, $B_2O_3$, $K_2O$) falls within a domain formed by connecting points F(65, 35, 0), G(65, 20, 15), H(85, 0, 15), and I(85, 15, 0) in the ternary diagram shown in FIG. 2. When the proportions fall within the domains X and Y which are located outside of this domain, as in the case of Samples 13 and 16 shown in Table 4, Q is 500 or less at 3 GHz, which is disadvantageous. When the proportions fall within the domain Z, as in the case of Sample 23 shown in Table 4, the sample cannot be sintered at 1050° C. or less, which is disadvantageous.

Figure 2:
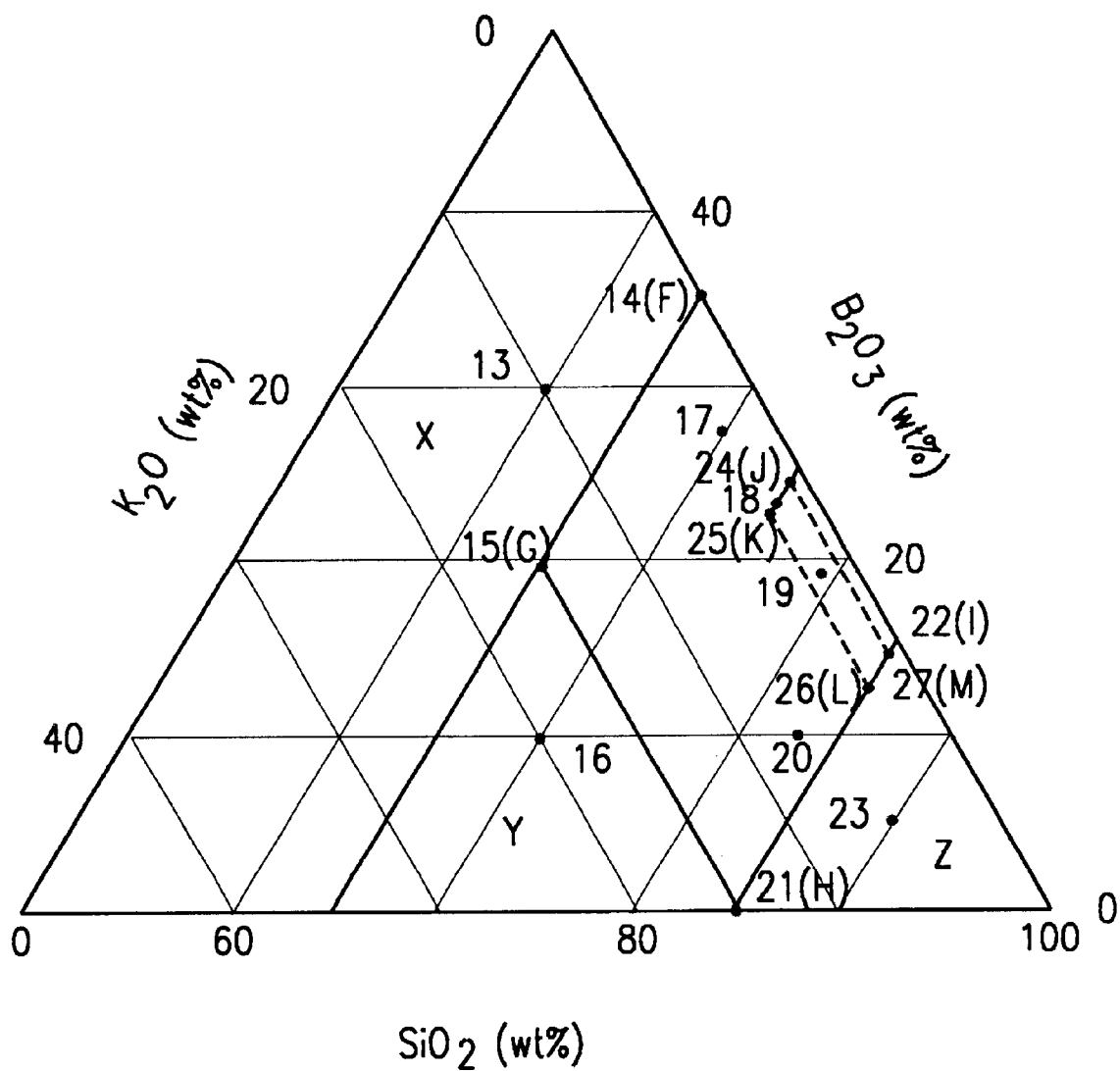
FIG. 2 is a ternary diagram showing a range of the compositional proportions of glass component of the dielectric ceramic composition of the present invention.

More preferably, the compositional proportions of the three components represented by ($SiO_2$, $B_2O_3$, $K_2O$) fall within a domain formed by connecting points J(75, 24.5, 0.5), K(75, 22, 3), L(85, 12, 3), and M(85, 14.5, 0.5) in the ternary diagram of FIG. 2. When the proportions fall within this domain, as in the case of Samples 24, 25, 26, and 27 shown in Table 3, the samples have a softening point of 750–940° C. to facilitate formation procedures, as molding is performed at 950° C. or less. Therefore, the reactivity of the glass to other materials such as an electrode material is remarkably low.

Furthermore, the silicate glass preferably contains, in addition to primary components which are $SiO_2$ and at least one of $B_2O_3$ and $K_2O$, at least one species selected from among $Li_2O$, $Na_2O$, MgO, CaO, SrO, BaO, ZnO, $Al_2O_3$, $La_2O_3$, $Ta_2O_5$, $Nd_2O_3$ and compounds thereof in an amount of 5 wt. % or less based on 100 wt. % of the entirety of the primary components of the silicate glass. When at least one of 11 species is added in an amount of 5 wt. % or less based on the entirety of the primary components of the silicate glass, Q and the temperature-dependent characteristic of capacitance (TCC) of the resultant composition do not significantly deteriorate, as shown in Table 4. The limitation of the amount of the additives is determined based on Q and the temperature-capacitance characteristic (TCC).

Finally, the reason why the range of the compositional proportions of the Si—Mg—Al—O ceramic material is limited will next be described with reference to the ternary diagram shown in FIG. 3.

Figure 3:
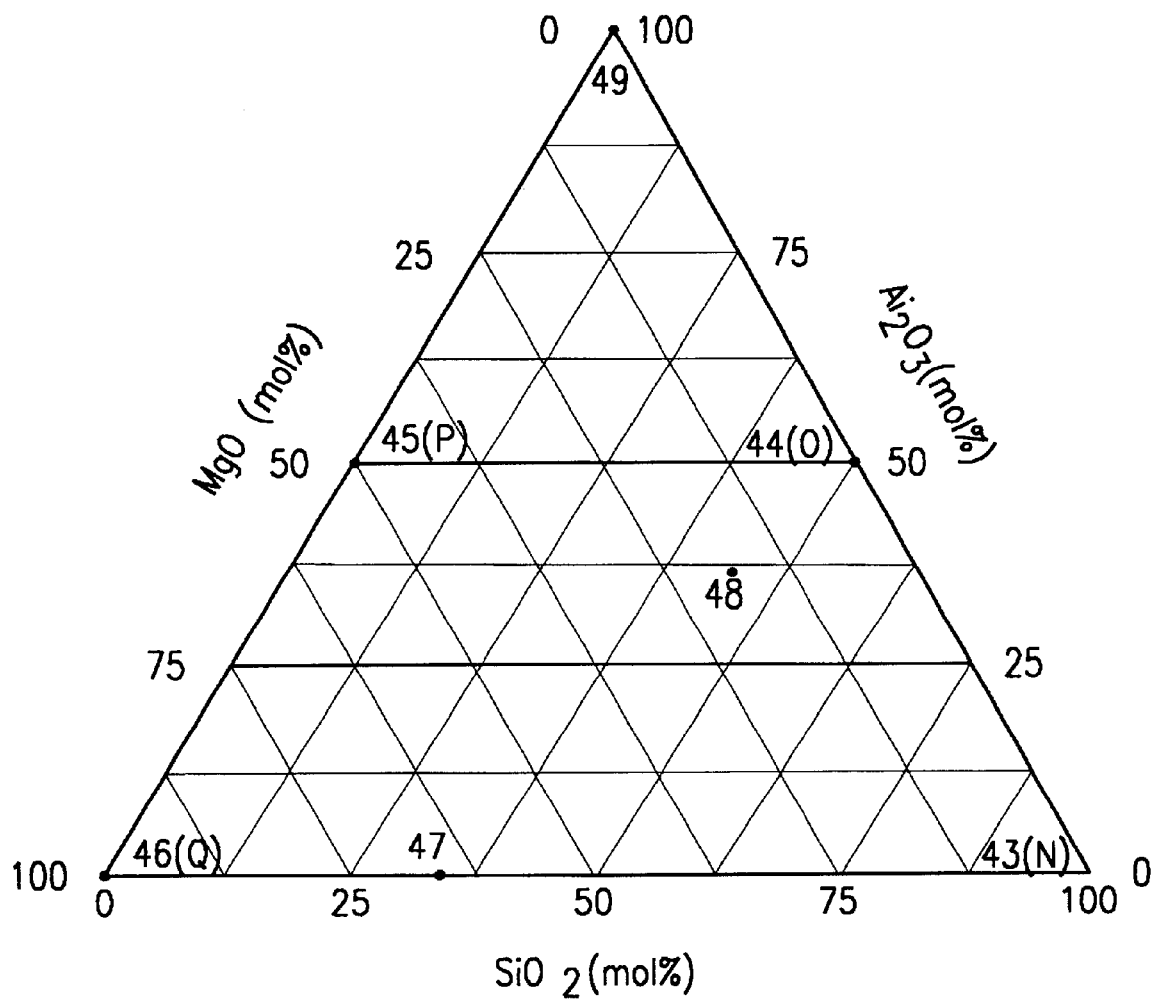
FIG. 3 is a ternary diagram showing a range of the compositional proportions of the Si—Mg—Al—O ceramic component of the dielectric ceramic composition of the present invention.

In the Si—Mg—Al—O ceramic material, the compositional proportions of the three components based on mol % represented by ($SiO_2$, $Al_2O_3$, MgO) preferably fall within a domain formed by connecting points N(100, 0, 0), O(50, 50, 0), P(0, 50, 50), and Q(0, 0, 100) in the ternary diagram of FIG. 3. As clearly seen in Table 6, when the proportions fall within this domain, Q is in excess of 500 at 3 GHz, whereas when the proportions fall outside of the domain as in the case of Sample 49, Q is disadvantageously low.

EXAMPLES

Example 1

$SiO_2$, $B_2O_3$ and $K_2CO_3$ were procured as raw materials for preparing a glass component, and were mixed in appropriate amounts so as to attain the following composition: $SiO_2/B_2O_3/K_2CO_3$=79/19/2 (wt. %). The resultant mixture was melted at 1500–1750° C. so as to obtain molten glass. The molten glass was quenched by use of quenching rollers and then pounded, to thereby obtain glass powder.

Separately, $MgCO_3$, $SiO_2$, and $Al(OH)_3$ were procured as raw materials for preparing a ceramic component, and were weighed so as to attain the following composition: $MgO/SiO_2/Al_2O_3$=64/31/5 (mol %). The materials were wet-mixed, dried and fired at 1200–1550° C. so as to obtain a ceramic. The ceramic was pounded to thereby obtain a ceramic powder.

Next, glass powder, Si—Mg—Al—O ceramic powder, and $TiO_2$ powder were blended in appropriate amounts so as to attain the respective compositions shown in Table 1, and the resultant mixture was wet-mixed by use of, for example, a zirconia ball mill for 3–4 hours, so as to obtain a homogeneous powder mixture of the three components. Subsequently, an organic binder and toluene serving as a solvent were added to the powder mixture, followed by thorough kneading by use of a ball mill so as to allow uniform dispersion, and degassing under reduced pressure, to thereby obtain a slurry. Organic vehicles such as a binder, solvent, and a plasticizer can be those which are customarily employed, with their components being not particularly limited.

The slurry was cast onto a film, and through use of a doctor blade, a ceramic green sheet having a thickness of 0.2 mm was formed. The ceramic sheet was brought to dryness, peeled off, and punched to obtain ceramic green sheets of a predetermined size. A plurality of the ceramic green sheets were placed one on another and press-formed, to thereby obtain a ceramic compact.

The thus-prepared ceramic compacts were heated at 200° C./hr, and fired at respective temperatures shown in Table 1 for 2 hours, to thereby obtain sintered ceramic products.

The thus-obtained sintered ceramic products were evaluated for relative dielectric constant, Q, and temperature-dependent characteristic of capacitance (TCC). Relative dielectric constant and Q were evaluated for samples having a size of 50 mm×50 mm×0.635 mm, through use of the method involving perturbation at 3 GHz. Temperature-dependent characteristic of capacitance (TCC) was evaluated by use of an LCR meter for samples each having a size of 10 mm×10 mm×0.5 mm and having InGa electrodes formed on both sides thereof by coating. The measurement conditions were as follows: frequency 1 MHz; voltage 1 Vrms; temperature range −25 to 85° C. (standard temperature 20° C.).

The results are shown in Table 2. In Table 2, samples other than those marked with "*" fall within preferable ranges.

TABLE 1

| Samples | Composition (wt %) | | | Firing Temperature (° C.) |
|---|---|---|---|---|
| | Glass Powder | Si-Al-Mg-O Ceramic | TiO$_2$ Powder | |
| 1 (A, A', A") | 100 | 0 | 0 | 900 |
| 2 (B, B') | 30 | 70 | 0 | 900 |
| 3 (C) | 30 | 0 | 70 | 900 |
| 4 (C') | 30 | 30 | 40 | 900 |
| 5 (D') | 80 | 0 | 20 | 900 |
| 6 (B") | 40 | 60 | 0 | 900 |
| 7 (C") | 30 | 65 | 5 | 900 |
| 8 (D") | 30 | 50 | 20 | 900 |
| 9 (E") | 85 | 0 | 15 | 900 |
| 10 | 60 | 30 | 10 | 900 |
| 11* | 25 | 75 | 0 | 1050 |
| 12* | 25 | 0 | 75 | 1050 |

TABLE 2

| Samples | 3 GHz | | | Sinterability At Lower Than 100° C. |
|---|---|---|---|---|
| | Relative Dielectric Constant $\epsilon r$ | Q | TCC (ppm/° C.) | |
| 1 (A, A', A") | 3.8 | 1000 | 30 | Yes |
| 2 (B, B') | 5.2 | 1300 | 110 | Yes |
| 3 (C) | 28.0 | 1500 | −500 | Yes |
| 4 (C') | 16.5 | 1400 | −250 | Yes |
| 5 (D') | 6.8 | 1200 | −130 | Yes |
| 6 (B") | 4.9 | 1100 | 100 | Yes |
| 7 (C") | 7.2 | 1200 | 80 | Yes |
| 8 (D") | 10.1 | 1200 | −70 | Yes |
| 9 (E") | 5.0 | 1000 | −90 | Yes |
| 10 | 5.8 | 1000 | −10 | Yes |
| 11* | — | — | — | No |
| 12* | — | — | — | No |

As is apparent from Table 2, when fired at a relatively low temperature of not higher than 1050° C., low-temperature-sinterable ceramic compositions of the present invention for temperature compensation exhibit good sinterability, high Q, and excellent temperature-dependent characteristic of capacitance (TCC).

Example 2

SiO$_2$, B$_2$O$_3$, K$_2$CO$_3$, Li$_2$CO$_3$, Na$_2$CO$_3$, MgO, CaO, SrO, BaCO$_3$, ZnO, Al$_2$O$_3$, La$_2$O$_3$, Ta$_2$O$_5$ and Nd$_2$O$_3$ were procured as raw materials for preparing a glass component, and were mixed in appropriate amounts so as to attain respective glass compositions shown in Table 3. Each of the resultant mixtures was melted at 1500–1750° C. so as to obtain molten glass. The molten glass was quenched by use of quenching rollers and then pounded, to thereby obtain glass powder.

Separately, MgCO$_3$, SiO$_2$ and Al(OH)$_3$ were procured as raw materials for preparing a ceramic component, and were weighed so as to attain the following composition: MgO/SiO$_2$/Al$_2$O$_3$=64/31/5 (mol %). The materials were wet-mixed, dried and fired at 1200–1550° C. so as to obtain a ceramic. The ceramic was pounded to thereby obtain ceramic powder.

Next, glass powder, Si—Mg—Al—O ceramic powder, and TiO$_2$ powder were blended in appropriate amounts so as to attain the following composition: glass powder/Si—Mg—Al—O ceramic powder/TiO$_2$ powder=60/30/10 (wt. %), and the resultant mixture was wet-mixed by use of, for example, a zirconia ball mill for 3–4 hours, so as to obtain a homogeneous powder mixture of the three components. Subsequently, an organic binder and toluene serving as a solvent were added to the powder mixture, followed by thorough kneading by use of a ball mill so as to allow uniform dispersion, and degassing under reduced pressure, to thereby obtain a slurry. Organic vehicles such as a binder, a solvent, and a plasticizer can be those which are customarily employed, with their components being not particularly limited.

The slurry was cast onto a film, and through use of a doctor blade, a ceramic green sheet having a thickness of 0.2 mm was formed. The ceramic sheet was brought to dryness, peeled off, and punched to obtain ceramic green sheets of a predetermined size. A plurality of the ceramic green sheets were layered one on another and press-formed, to thereby obtain a ceramic compact.

The thus-prepared ceramic compacts were heated at 200° C./hr, and fired at respective temperatures shown in Table 4 for 2 hours, to thereby obtain sintered ceramic products.

The thus-obtained sintered ceramic products were evaluated for relative dielectric constant, Q, and temperature-dependent characteristic of capacitance (TCC). Relative dielectric constant and Q were evaluated for samples having a size of 50 mm×50 mm×0.635 mm, through use of the method involving perturbation at 3 GHz. Temperature-dependent characteristic of capacitance (TCC) was evaluated by use of an LCR meter for samples each having a size of 10 mm×10 mm×0.5 mm and having InGa electrodes formed on both sides thereof by coating. The measurement conditions were as follows: frequency 1 MHz; voltage 1 Vrms; temperature range −25 to 85° C. (standard temperature 20° C.).

The results are shown in Table 4. In Table 4, samples other than those marked with "*" fall within preferable ranges.

TABLE 3

| Sample No. | Glass Composition (wt %) | | | | | | | | | | | | | | Softening Point (° C.) |
|---|---|---|---|---|---|---|---|---|---|---|---|---|---|---|---|
| | SiO$_2$ | B$_2$O$_3$ | K$_2$O | Li$_2$O | Na$_2$O | MgO | CaO | SrO | BaO | ZnO | Al$_2$O$_3$ | La$_2$O$_3$ | Ta$_2$O$_3$ | Nd$_2$O$_3$ | |
| 13 | 60 | 30 | 10 | 0 | 0 | 0 | 0 | 0 | 0 | 0 | 0 | 0 | 0 | 0 | 690 |
| 14 | 65 | 35 | 0 | 0 | 0 | 0 | 0 | 0 | 0 | 0 | 0 | 0 | 0 | 0 | 700 |
| 15 | 65 | 20 | 15 | 0 | 0 | 0 | 0 | 0 | 0 | 0 | 0 | 0 | 0 | 0 | 720 |
| 16 | 70 | 10 | 20 | 0 | 0 | 0 | 0 | 0 | 0 | 0 | 0 | 0 | 0 | 0 | 710 |
| 17 | 70 | 28 | 2 | 0 | 0 | 0 | 0 | 0 | 0 | 0 | 0 | 0 | 0 | 0 | 720 |
| 18 | 75 | 23 | 2 | 0 | 0 | 0 | 0 | 0 | 0 | 0 | 0 | 0 | 0 | 0 | 760 |
| 19 | 79 | 19 | 2 | 0 | 0 | 0 | 0 | 0 | 0 | 0 | 0 | 0 | 0 | 0 | 800 |

TABLE 3-continued

| Sample No. | Glass Composition (wt %) | | | | | | | | | | | | | | Softening Point (° C.) |
|---|---|---|---|---|---|---|---|---|---|---|---|---|---|---|---|
| | SiO₂ | B₂O₃ | K₂O | Li₂O | Na₂O | MgO | CaO | SrO | BaO | ZnO | Al₂O₃ | La₂O₃ | Ta₂O₃ | Nd₂O₃ | |
| 20 | 83 | 10 | 7 | 0 | 0 | 0 | 0 | 0 | 0 | 0 | 0 | 0 | 0 | 0 | 950 |
| 21 | 85 | 0 | 15 | 0 | 0 | 0 | 0 | 0 | 0 | 0 | 0 | 0 | 0 | 0 | 1050 |
| 22 | 85 | 15 | 0 | 0 | 0 | 0 | 0 | 0 | 0 | 0 | 0 | 0 | 0 | 0 | 950 |
| 23 | 90 | 5 | 5 | 0 | 0 | 0 | 0 | 0 | 0 | 0 | 0 | 0 | 0 | 0 | >1050 |
| 24 | 75 | 24.5 | 0.5 | 0 | 0 | 0 | 0 | 0 | 0 | 0 | 0 | 0 | 0 | 0 | 750 |
| 25 | 75 | 22 | 3 | 0 | 0 | 0 | 0 | 0 | 0 | 0 | 0 | 0 | 0 | 0 | 750 |
| 26 | 85 | 12 | 3 | 0 | 0 | 0 | 0 | 0 | 0 | 0 | 0 | 0 | 0 | 0 | 930 |
| 27 | 85 | 14.5 | 0.5 | 0 | 0 | 0 | 0 | 0 | 0 | 0 | 0 | 0 | 0 | 0 | 940 |
| 28 | 79 | 19 | 2 | 5 | 0 | 0 | 0 | 0 | 0 | 0 | 0 | 0 | 0 | 0 | 740 |
| 29 | 79 | 19 | 2 | 0 | 5 | 0 | 0 | 0 | 0 | 0 | 0 | 0 | 0 | 0 | 720 |
| 30 | 79 | 19 | 2 | 0 | 0 | 5 | 0 | 0 | 0 | 0 | 0 | 0 | 0 | 0 | 830 |
| 31 | 79 | 19 | 2 | 0 | 0 | 0 | 5 | 0 | 0 | 0 | 0 | 0 | 0 | 0 | 810 |
| 32 | 79 | 19 | 2 | 0 | 0 | 0 | 0 | 5 | 0 | 0 | 0 | 0 | 0 | 0 | 810 |
| 33 | 79 | 19 | 2 | 0 | 0 | 0 | 0 | 0 | 5 | 0 | 0 | 0 | 0 | 0 | 800 |
| 34 | 79 | 19 | 2 | 0 | 0 | 0 | 0 | 0 | 0 | 5 | 0 | 0 | 0 | 0 | 810 |
| 35 | 79 | 19 | 2 | 0 | 0 | 0 | 0 | 0 | 0 | 0 | 5 | 0 | 0 | 0 | 810 |
| 36 | 79 | 19 | 2 | 0 | 0 | 0 | 0 | 0 | 0 | 0 | 0 | 5 | 0 | 0 | 800 |
| 37 | 79 | 19 | 2 | 0 | 0 | 0 | 0 | 0 | 0 | 0 | 0 | 0 | 5 | 0 | 770 |
| 38 | 79 | 19 | 2 | 0 | 0 | 0 | 0 | 0 | 0 | 0 | 0 | 0 | 0 | 5 | 780 |
| 39 | 79 | 19 | 2 | 2.5 | 2.5 | 0 | 0 | 0 | 0 | 0 | 0 | 0 | 0 | 0 | 720 |
| 40 | 79 | 19 | 2 | 0 | 0 | 1 | 1 | 1 | 1 | 1 | 0 | 0 | 0 | 0 | 810 |
| 41 | 79 | 19 | 2 | 0.5 | 0 | 0.5 | 0.5 | 0.5 | 0.5 | 0.5 | 0.5 | 0.5 | 0.5 | 0.5 | 790 |
| 42 | 79 | 19 | 2 | 0 | 0.5 | 0.5 | 0.5 | 0.5 | 0.5 | 0.5 | 0.5 | 0.5 | 0.5 | 0.5 | 790 |

TABLE 4

| Sample No. | 3 GHz | | | Sinterability | |
|---|---|---|---|---|---|
| | Relative Dielectric Constant εr | Q | TCC (ppm/° C.) | At Lower Than 100° C. | Firing Temperature (° C.) |
| 13* | 7.3 | 500 | 20 | Yes | 900 |
| 14 | 5.9 | 800 | −5 | Yes | 900 |
| 15 | 8.1 | 600 | 25 | Yes | 900 |
| 16* | 9.0 | 500 | 302 | Yes | 900 |
| 17 | 6.1 | 1100 | −10 | Yes | 900 |
| 18 | 6.0 | 1000 | −10 | Yes | 900 |
| 19 | 5.8 | 1000 | −10 | Yes | 900 |
| 20 | 7.7 | 600 | 20 | Yes | 1050 |
| 21 | 8.2 | 600 | 20 | Yes | 1050 |
| 22 | 5.7 | 1100 | −15 | Yes | 1050 |
| 23* | — | — | — | No | 1050 |
| 24 | 5.8 | 1000 | −10 | Yes | 900 |
| 25 | 6.0 | 900 | −15 | Yes | 900 |
| 26 | 6.0 | 900 | −15 | Yes | 900 |
| 27 | 5.8 | 1000 | −5 | Yes | 900 |
| 28 | 7.5 | 800 | 10 | Yes | 900 |
| 29 | 7.6 | 800 | 15 | Yes | 900 |
| 30 | 6.1 | 1000 | −5 | Yes | 900 |
| 31 | 6.2 | 1000 | 10 | Yes | 900 |
| 32 | 6.8 | 1000 | −10 | Yes | 900 |
| 33 | 6.8 | 1000 | 25 | Yes | 900 |
| 34 | 6.7 | 1000 | 20 | Yes | 900 |
| 35 | 6.6 | 900 | 30 | Yes | 900 |
| 36 | 6.5 | 900 | −10 | Yes | 900 |
| 37 | 6.6 | 900 | 20 | Yes | 900 |
| 38 | 6.8 | 900 | 10 | Yes | 900 |
| 39 | 7.5 | 1000 | 15 | Yes | 900 |
| 40 | 6.5 | 1000 | 10 | Yes | 900 |
| 41 | 6.7 | 900 | −10 | Yes | 900 |
| 42 | 6.8 | 900 | 10 | Yes | 900 |

As is apparent from Table 4, when fired at a relatively low temperature of not higher than 1050° C., low-temperature-sinterable ceramic compositions of the present invention for temperature compensation exhibit good sinterability, high Q, and excellent temperature-dependent characteristic of capacitance (TCC).

Example 3

SiO₂, B₂O₃ and K₂CO₃ were procured as raw materials for preparing a glass component, and were mixed in appropriate amounts so as to attain the following composition: SiO₂/B₂O₃/K₂O =79/19/2 (wt. %). The resultant mixture was melted at 1500–1750° C. so as to obtain molten glass. The molten glass was quenched by use of quenching rollers and then pounded, to thereby obtain glass powder.

Separately, SiO₂, Al₂O₃ and MgCO₃ were procured as raw materials for preparing a ceramic component, and were weighed so as to attain respective compositions shown in Table 5. The materials were wet-mixed, dried and fired at 1200–1550° C. so as to obtain a ceramic. The ceramic was pounded to thereby obtain ceramic powder.

Next, glass powder, Si—Mg—Al—O ceramic powder, and TiO₂ powder were blended in appropriate amounts so as to attain the following composition: glass powder/Si—Mg—Al—O ceramic powder/TiO₂ powder=60/30/10 (wt. %), and the resultant mixture was wet-mixed by use of, for example, a zirconia ball mill for 3–4 hours, so as to obtain a homogeneous powder mixture of the three components. Subsequently, an organic binder and toluene serving as a solvent were added to the powder mixture, followed by thorough kneading by use of a ball mill so as to allow uniform dispersion, and degassing under reduced pressure, to thereby obtain a slurry. Organic vehicles such as a binder, solvent, and a plasticizer can be those which are customarily employed, with their components being not particularly limited.

The slurry was cast onto a film, and through use of a doctor blade, a ceramic green sheet having a thickness of 0.2 mm was formed. The ceramic sheet was brought to dryness, peeled off, and punched to obtain ceramic green sheets of a predetermined size. A plurality of the ceramic green sheets were layered one on another and press-formed, to thereby obtain a ceramic compact.

The thus-prepared ceramic compacts were heated at 200° C./hr, and fired at respective temperatures shown in Table 6 for 2 hours, to thereby obtain sintered ceramic products.

The thus-obtained sintered ceramic products were evaluated for relative dielectric constant, Q, and temperature-dependent characteristic of capacitance (TCC). Relative dielectric constant and Q were evaluated for samples having a size of 50 mm×50 mm×0.635 mm through use of the method involving perturbation at 3 GHz. Temperature-dependent characteristic of capacitance (TCC) was evaluated by use of an LCR meter for samples each having a size of 10 mm×10 mm×0.5 mm and having InGa electrodes formed on both sides thereof by coating. The measurement conditions were as follows: frequency 1 MHz; voltage 1 Vrms; temperature range −25 to 85° C. (standard temperature 20° C.).

The results are shown in Table 6. In Table 6, samples other than those marked with "*" fall within preferable ranges.

TABLE 5

| | Ceramic Composition (mol %) | | |
|---|---|---|---|
| Sample No. | $SiO_2$ | $Al_2O_3$ | MgO |
| 43 (N) | 100 | 0 | 0 |
| 44 (O) | 50 | 50 | 0 |
| 45 (P) | 0 | 50 | 50 |
| 46 (Q) | 0 | 0 | 100 |
| 47 | 33.3 | 0 | 66.7 |
| 48 | 15.5 | 36.3 | 18.2 |
| 49* | 0 | 100 | 0 |

TABLE 6

| | 3 GHz | | | | |
|---|---|---|---|---|---|
| Sample No. | Relative Dielectric Constant εr | Q | TCC (ppm/° C.) | Sinterability At Lower than 100° C. | Firing Temperature (° C.) |
| 43 (N) | 4.9 | 1000 | −40 | Yes | 900 |
| 44 (O) | 5.9 | 600 | 40 | Yes | 900 |
| 45 (P) | 6.0 | 600 | 50 | Yes | 900 |
| 46 (Q) | 5.2 | 1000 | 50 | Yes | 900 |
| 47 | 5.8 | 1000 | −10 | Yes | 900 |
| 48 | 5.4 | 600 | 50 | Yes | 900 |
| 49* | 6.3 | 300 | 60 | Yes | 900 |

As is apparent from Table 6, when fired at a relatively low temperature of not higher than 1050° C., the low-temperature-sinterable ceramic compositions of the present invention for temperature compensation exhibit good sinterability, high Q, and excellent temperature-dependent characteristic of capacitance (TCC).

Example 4

The following example shows a method of producing a monolithic ceramic capacitor from the conductive ceramic compositions of the present invention.

$SiO_2$, $B_2O_3$ and $K_2CO_3$ were procured as raw materials for preparing a glass component, and were mixed in appropriate amounts so as to attain the following composition: $SiO_2/B_2O_3/K_2O$ =79/19/2 (wt. %). The resultant mixture was melted at 1500–1750° C. so as to obtain molten glass. The molten glass was quenched by use of quenching rollers and then pounded, to thereby obtain glass powder.

Separately, $MgCO_3$, $SiO_2$ and $Al(OH)_3$ were procured as raw materials for preparing a ceramic component, and were weighed so as to attain the following composition: $MgO/SiO_2/Al_2O_3$=64/31/5 (mol %). The materials were wet-mixed, dried and fired at 1200–1550° C. so as to obtain a ceramic. The ceramic was pounded to thereby obtain ceramic powder.

Next, glass powder, Si—Mg—Al—O ceramic powder and $TiO_2$ powder were blended in appropriate amounts so as to attain respective compositions shown in Table 7, and the resultant mixtures were wet-mixed by use of, for example, a zirconia ball mill for 3–4 hours, so as to obtain a homogeneous powder mixture of the three components. Subsequently, an organic binder and toluene serving as a solvent were added to the powder mixture, followed by thorough kneading by use of a ball mill so as to allow uniform dispersion, and degassing under reduced pressure, to thereby obtain a slurry. Organic vehicles such as a binder, solvent, and a plasticizer can be those which are customarily employed, with their components being not particularly limited.

The slurry was cast onto a film, and through use of a doctor blade, a ceramic green sheet having a thickness of 10–100 μm was formed. The ceramic sheet was brought to dryness, peeled off, and punched to obtain ceramic green sheets of a predetermined size. On each of the ceramic green sheets, an Ag electrode was printed and dried, and a plurality of the ceramic green sheets were layered and press-formed to thereby obtain a ceramic compact having a capacitance of 10 pF.

The thus-prepared ceramic compacts were heated at 200° C./hr, and fired at respective temperatures shown in Table 7 for 1 hour, to thereby obtain sintered ceramic products.

The thus-obtained sintered ceramic products were evaluated for relative dielectric constant, Q, and temperature-dependent characteristic of capacitance (TCC). Relative dielectric constant and Q were evaluated through use of an impedance analyzer at 1 GHz. Temperature-dependent characteristic of capacitance (TCC) was evaluated by use of an LCR meter. The measurement conditions were as follows: frequency 1 MHz; voltage 1 Vrms; temperature range −25 to 85° C. (standard temperature 20° C.).

The results are shown in Table 8.

TABLE 7

| | Composition (wt %) | | | Firing |
|---|---|---|---|---|
| Sample No. | Glass Powder | Si-Al-Mg-O Ceramic | $TiO_2$ Powder | Temperature (° C.) |
| 50 | 100 | 0 | 0 | 900 |
| 51 | 40 | 0 | 60 | 900 |
| 52 | 40 | 60 | 0 | 900 |
| 53 | 60 | 30 | 10 | 900 |

TABLE 8

| | 3 GHz | | |
|---|---|---|---|
| Sample No. | Capacitance (pF) | Q | TCC (ppm/° C.) |
| 50 | 10 | 300 | 10 |
| 51 | 10 | 310 | −270 |
| 52 | 10 | 310 | 80 |
| 53 | 10 | 300 | −30 |

As is apparent from Table 8, low-temperature-sinterable ceramic compositions of the present invention for temperature compensation exhibit the following advantages. The compositions show good sinterability at low temperature, so that an electrode made of Ag or a similar material can be used; show high Q; and temperature-dependent characteristic of capacitance is easily controlled.

As is clear from Tables 2, 4, and 6, the present invention provides dielectric ceramic composition for temperature compensation which can be fired at a relatively low temperature, i.e., at a temperature not higher than 1050° C., which achieves Q>500 and $\epsilon r<30$ at 3 GHz, and which exhibits TCC which falls within the range of ±500.

As described hereinabove, the present invention provides a dielectric ceramic composition which can be sintered at low temperature and has a low dielectric constant, high Q, and favorable temperature-dependent characteristic of capacitance (TCC) in a high-frequency region. The present invention also provides a ceramic electronic element produced from the same.

What is claimed is:

1. A dielectric ceramic composition, comprising silicate glass and $TiO_2$ and optionally an Si—Mg—Al—O ceramic, wherein said silicate glass comprises $SiO_2$ and at least one of $B_2O_3$ and $K_2O$, and the compositional proportions of said three components based on wt. % represented by ($SiO_2$, $B_2O_3$, $K_2O$) fall inside a polygon formed by connecting points J(75, 24.5, 0.5), K(75, 22, 3), L(85, 12, 3), and M(85, 14.5, 0.5) in the ternary diagram thereof and wherein said silicate glass further contains at least one member selected from the group consisting of $Li_2O$, $Na_2O$, MgO, CaO, SrO, BaO, ZnO, $Al_2O_3$, $La_2O_3$, $Ta_2O_5$, $Nd_2O_3$ and compounds thereof in an amount of 5 wt. % or less based on 100 wt. % of the entirety of said $SiO_2$ and at least one of $B_2O_3$ and $K_2$, and wherein the compositional proportions of said three components based on wt. % represented by (glass, Si—Mg—Al—O ceramic, $TiO_2$) fall inside a polygon formed by connecting points A"(100, 0, 0), B"(40, 60, 0), C"(30, 65, 5), D"(30, 50, 20), and E"(85, 0, 15) in the ternary diagram thereof.

* * * * *